(No Model.)

G. H. GERE.
DUST PAN.

No. 531,177. Patented Dec. 18, 1894.

WITNESSES:   INVENTOR
Lewis E. Flanders   George H. Gere
Lois Moulton   BY Luther V. Moulton
   ATTORNEY.

UNITED STATES PATENT OFFICE.

GEORGE H. GERE, OF GRAND RAPIDS, MICHIGAN.

DUST-PAN.

SPECIFICATION forming part of Letters Patent No. 531,177, dated December 18, 1894.

Application filed April 23, 1894. Serial No. 508,564. (No model.)

*To all whom it may concern:*

Be it known that I, GEORGE H. GERE, a citizen of the United States, residing at Grand Rapids, in the county of Kent and State of Michigan, have invented certain new and useful Improvements in Dust-Pans; and I do hereby declare the following to be a full, clear, and exact description of the invention, such as will enable others skilled in the art to which it appertains to make and use the same.

My invention relates to an improved dust pan, and its object is to provide the same with certain new and useful features, hereinafter more fully described and particularly pointed out in the claims, reference being had to the accompanying drawings, in which—

Figure 1:
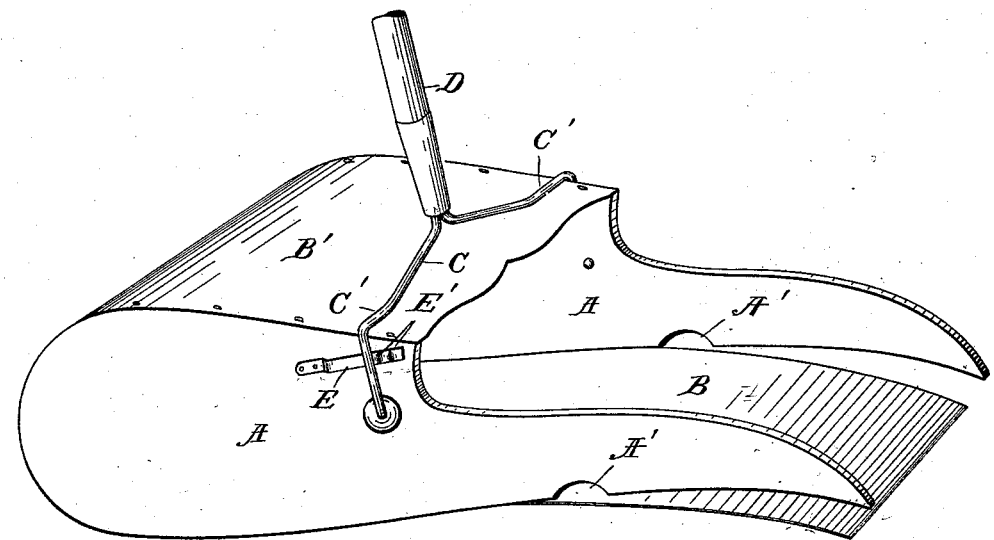
Figures 2, 3:
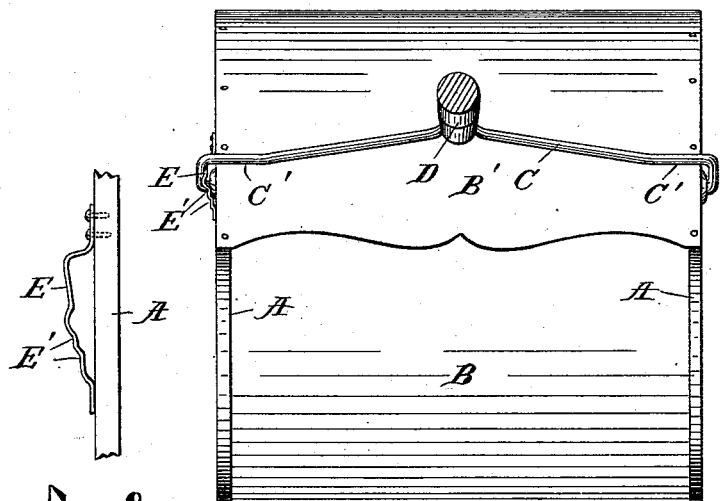

Figure is a perspective of a device embodying my invention; Fig. 2, a plan view of the same, and Fig. 3 a detail showing a plan view of the bale spring.

Like letters refer to like parts in all of the figures.

A. A. represent the side walls of the dust pan proper, formed substantially as shown, with a semi-circular outline at the rear and forwardly projecting and downwardly curved forward ends. To these end walls is secured a flexible bottom B, which bottom is also extended around the semi-circular rear ends of said walls, and returned above the same, forming a pocket, or receptacle B' at the rear end of the device and open at the forward side to receive the dust. Said bottom B at its forward side is detached from the end walls A, and curved downward, being normally separated therefrom at its forward edge, and being of flexible material forms a yielding or spring support for the front of said pan.

A', A' are openings, or notches in the walls A, A, to release dust and other matter that may chance to get between the lower edge of said walls and the forward part of the bottom B.

D is a handle of any convenient length, having attached at its lower end diverging arms C, which extend oppositely and downward, embracing the dust pan and pivoted at their respective ends to the end walls A, somewhat forward of the center of gravity of the dust pan, whereby the same tends to turn on said pivots, with its forward side upward. The diverging arms C have portions C', arranged in a line at right angles to the handle D, and adapted to contact the top of the receptacle B', and thus limit the movement of the handle toward the rear of the pan. A spring E is attached to the outer surface of the end wall A and engages the inner side of the arm C. Said spring is provided with one or more concavities E', which are engaged by the arm C and thus is enabled to hold the handle D at various angles relative to the pan.

When used, the pan is placed on the carpet and the handle brought to substantially a vertical position. The spring E will now hold said handle in this position relative to the pan, with sufficient force to permit of lifting said pan from the floor, and moving the same from place to place, or to turn and empty the same. Pressure upon the handle D will force the flexible front of the bottom B in close contact with the carpet, and such contact will be maintained by the flexibility of said front, when the handle is vibrated, or its angle somewhat changed. By moving the handle forward until the arm C clears the spring E and then lifting the device, the rear of the dust pan will turn downward and the contents will fall into the pocket B'. It may then be conveniently carried about, or suspended against the wall by any suitable means.

What I claim is—

1. In a dust pan, side walls having forwardly projecting portions above the bottom, and detached therefrom, and a bottom having a detached downwardly curved and flexible forward portion, substantially as described.

2. In a dust pan, a bottom having a detached downwardly curved and flexible forward portion, and side walls having forwardly projecting portions above the same and detached therefrom, and openings, or notches for the escape of dust, substantially as described.

3. In a dust pan, side walls having semi-circular rear ends, downwardly curved forward ends, and notched lower sides, a bottom detached, downwardly curved, and flexible at its forward side and extended around and secured to the semi-circular walls, substantially as described.

In testimony whereof I affix my signature in presence of two witnesses.

GEORGE H. GERE.

Witnesses:
LUTHER V. MOULTON,
LEWIS E. FLANDERS.